United States Patent
Zhang

(10) Patent No.: US 11,427,359 B2
(45) Date of Patent: Aug. 30, 2022

(54) TENSIONER

(71) Applicant: Zhangjiagang Jinbao Hardware Technology Co., Ltd., Zhangjiagang (CN)

(72) Inventor: Jinhui Zhang, Zhangjiagang (CN)

(73) Assignee: Zhangjiagang Jinbao Hardware Technology Co., Ltd., Zhangjiagang (CN)

( * ) Notice: Subject to any disclaimer, the term of this patent is extended or adjusted under 35 U.S.C. 154(b) by 69 days.

(21) Appl. No.: 16/946,019

(22) Filed: Jun. 2, 2020

(65) Prior Publication Data
US 2021/0179379 A1    Jun. 17, 2021

(30) Foreign Application Priority Data
Dec. 12, 2019 (CN) .......................... 201911277004.3

(51) Int. Cl.
*B65B 13/22* (2006.01)
*B60P 7/08* (2006.01)

(52) U.S. Cl.
CPC ............ *B65B 13/22* (2013.01); *B60P 7/0823* (2013.01); *Y10T 24/2175* (2015.01)

(58) Field of Classification Search
None
See application file for complete search history.

(56) References Cited

U.S. PATENT DOCUMENTS

| | | | |
|---|---|---|---|
| 7,350,768 B1* | 4/2008 | Chang | B60P 7/083 254/218 |
| 10,046,734 B2* | 8/2018 | Lucht | B60R 22/46 |
| 2013/0025098 A1* | 1/2013 | Smith | B60P 7/083 24/68 CD |
| 2016/0331431 A1* | 11/2016 | Gephart | A61B 17/8863 |
| 2018/0141480 A1* | 5/2018 | Xu | B65B 13/22 |
| 2019/0344701 A1* | 11/2019 | Fountain, III | F16G 11/12 |

* cited by examiner

*Primary Examiner* — Charles A Fox
*Assistant Examiner* — William J Gately, III
(74) *Attorney, Agent, or Firm* — Innovation Capital Law Group, LLP; Vic Lin

(57) ABSTRACT

The invention discloses a tensioner comprising a belt shaft, a first bracket and a second bracket, a belt shaft hole is provided at a front end of the first bracket, the belt shaft passes through the hole and is hinged with the first bracket; a surface of the belt shaft is provided with a ratchet fixedly connected thereto and gaskets provided on two sides of the ratchet; one end of the second bracket is provided with a clamping portion, the clamping portion clamps two ends of the belt shaft and protrudes outwardly to form an accommodating cavity, balls are provided inside the accommodation cavity, and the balls are installed on an outer gasket of the belt shaft. The plastic gaskets greatly reduce the friction between the ratchet and the bracket, the balls provide a certain degree of freedom for the belt shaft to prevent the belt shaft from jamming.

8 Claims, 3 Drawing Sheets

TENSIONER

TECHNICAL FIELD

The present application relates to the technical field of machinery, and relates to a tensioner for binding goods.

BACKGROUND

As a binding tool, the tensioner is widely used. In the process of use, especially for bundling large goods, since the bundling belt is relatively long, this causes the problem of cumbersome retracting and low bundling efficiency.

In the tensioners of the prior art, due to the inherent problems of the mechanical structure during the process of retracting and tightening the belt, it takes time and effort to retract and tighten the belt. Especially during the process of retracting, the phenomenon of jamming often occurs. The belt shaft needs to be manually adjusted, affecting the normal use of the tensioner.

SUMMARY

An object of the present invention is to provide a tensioner to overcome the deficiencies in the prior art.

In order to achieve the above object, the present invention provides the following technical solution. A tensioner includes a belt shaft, a first bracket, a second bracket, a first resisting member and a second resisting member, wherein a belt shaft hole is provided at a front end of the first bracket, the belt shaft passes through the belt shaft hole and is hinged with the first bracket; a surface of the belt shaft is provided with a ratchet fixedly connected thereto and gaskets provided on two sides of the ratchet; one end of the second bracket is provided with a clamping portion, the clamping portion clamps two ends of the belt shaft, the clamping portion protrudes outwardly to form an accommodating cavity, balls are provided inside the accommodation cavity, and the balls are installed on an outer gasket of the belt shaft; the first resisting member is installed on the first bracket and always resists the ratchet, the second resisting member is installed on the second bracket and resists the ratchet, and at the same time the second resisting member resists the belt shaft hole, and is divided into a first working position and a second working position along an outer edge of the belt shaft hole; and when the tensioner is in a loose belt state, the second resisting member resists the first working position by an external force, and when the tensioner is in a tight belt state, the second resisting force member resists the second working position by an external force.

Preferably, a ball groove is provided on a surface of the outer gasket of the belt shaft, the ball groove cooperates with a ball cover to install the balls on the outer gasket, and the balls are evenly distributed around the outer gasket.

Preferably, the number of the balls is six.

Preferably, the gasket of the belt shaft is made of plastic material.

Preferably, a handle is provided at the other end of the second bracket, a fastening through hole is provided on the second bracket, a bolt is installed on the fastening through hole, and by tightening the bolt, the clamping portion clamps the belt shaft.

Preferably, the first resisting member includes a first resisting piece, a first spring, and a first elongated guide hole provided on the first bracket, the first resisting piece is disposed in the first guide hole and can move along the first guide hole, one end of the first spring is connected to the first bracket and the other end is connected to the first resisting piece, and the first spring provides the first resisting member with a force that always resists the ratchet.

Preferably, the second resisting member includes a second resisting piece, a handle, a second spring, and a first guide groove provided on the second bracket, the second resisting piece is installed in the first guide groove and can move along the first guide groove, the handle is fixedly connected to the second resisting piece, one end of the second spring is connected to the second bracket, the other end is connected to the second resisting piece and can provide the second resisting member with a force that always resists the ratchet, and by pulling the handle, an elastic force of the second spring can be overcome to make the second resisting piece move away from the ratchet.

Preferably, a rear hook shaft is provided at a rear end of the first bracket.

Preferably, the number of teeth of the ratchet is 16 teeth.

Compared with the prior art, the tensioner of the present invention is simple in structure and low in cost. The plastic gaskets provided on two sides of the ratchet greatly reduce the friction between the ratchet and the bracket; at the same time, balls are provided between the outer gasket and the clamping portion of the bracket to provide a certain degree of freedom for the belt shaft to prevent the belt shaft from jamming; and at the same time, a bolt through hole is provided on the second bracket to improve the stability of the bracket.

BRIEF DESCRIPTION OF THE DRAWINGS

In order to more clearly explain the technical solutions in the embodiments of the present application or the prior art, the following will briefly introduce the drawings used in the description of the embodiments or the prior art. Obviously, the drawings in the following description are only some of the embodiments described in the present application. For those skilled in the art, without paying any creative labor, other drawings can also be obtained based on these drawings.

DETAILED DESCRIPTION

The technical solutions in the embodiments of the present invention will be described in detail below in conjunction with the drawings in the embodiments of the present invention. Obviously, the described embodiments are only a part of the embodiments of the present invention, but not all the embodiments. Based on the embodiments of the present invention, all other embodiments obtained by those skilled in the art without creative efforts shall fall within the protection scope of the present invention.

Figure 1:
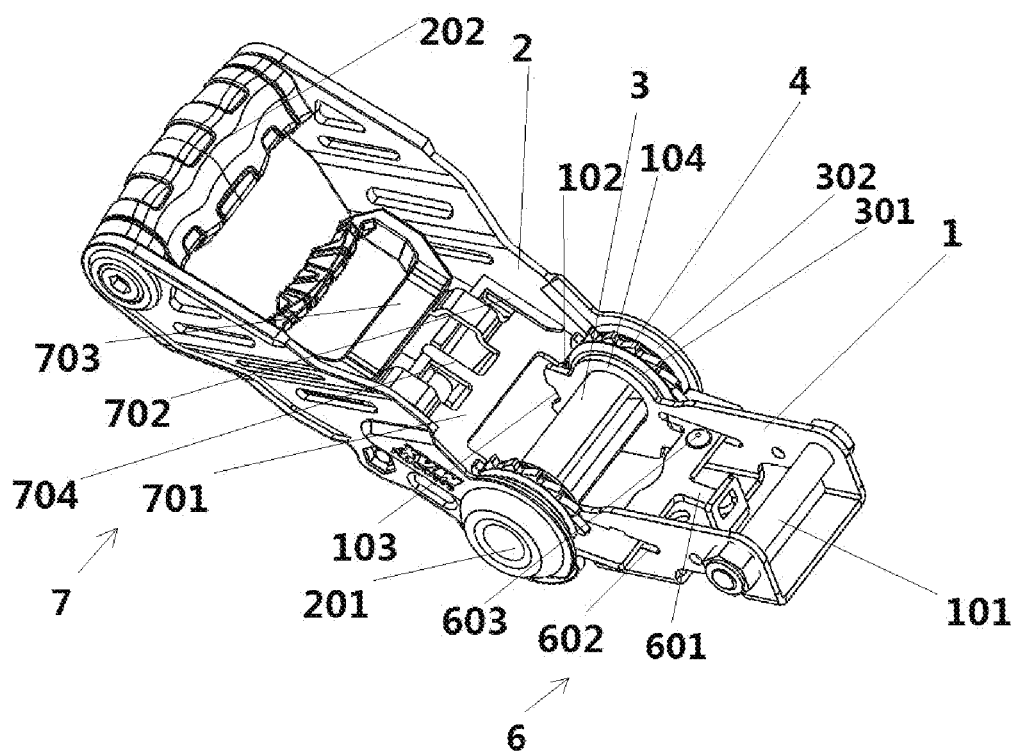
FIG. 1 is a schematic structural diagram of a tensioner according to a specific embodiment of the present invention.
Figure 2:
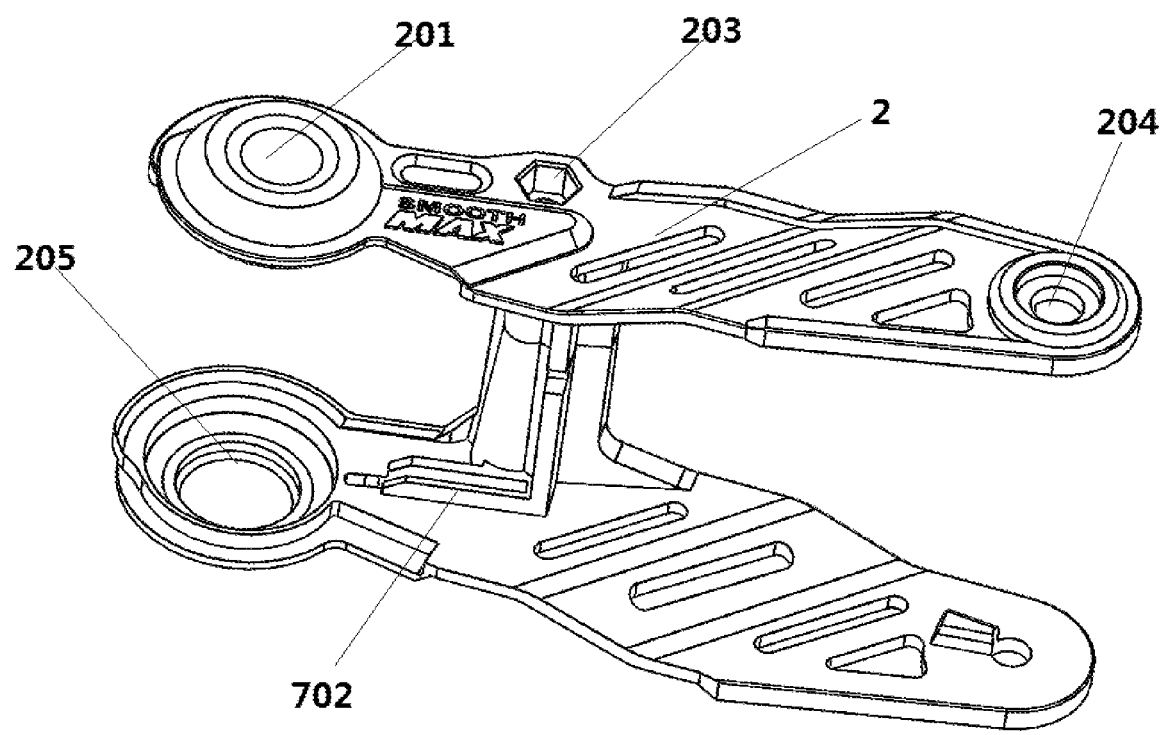
FIG. 2 is a schematic structural diagram of a second bracket of a tensioner according to a specific embodiment of the present invention.
Figure 3:
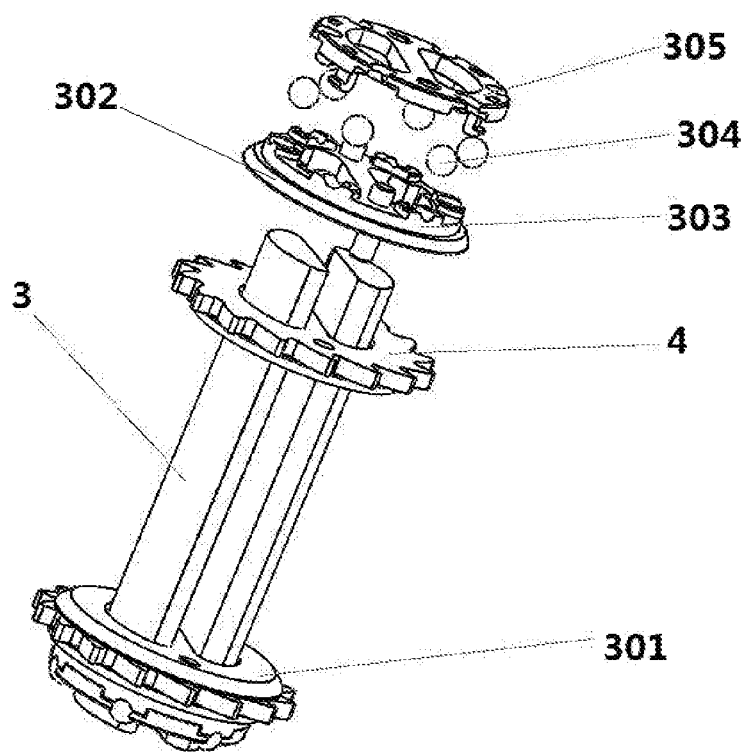
FIG. 3 is an exploded view of a belt shaft of a tensioner according to a specific embodiment of the present invention.

With reference to FIGS. 1-3, in order to achieve the above object, the present invention provides the following technical solution. A tensioner includes a belt shaft 3, a first bracket 1, a second bracket 2, a first resisting member 6, and a second resisting member 7. A belt shaft hole 104 is provided at a front end of the first bracket 1. The belt shaft 3 passes through the belt shaft hole 104 and is hinged with the first bracket 1. A surface of the belt shaft 3 is provided with a ratchet 4 fixedly connected thereto and two gaskets 301 and 302 provided on two sides of the ratchet 4. One end of the second bracket 2 is provided with a clamping portion 201. The clamping portion 201 clamps two ends of the belt shaft 3. The clamping portion 201 protrudes outward to form an accommodation cavity 205. Balls 304 are provided inside the accommodation cavity 205. The balls 304 are mounted on an outer gasket 302 of the belt shaft 3. The first resisting member 6 is mounted on the first bracket 1 and always resists the ratchet 4. The second resisting member 7 is mounted on the second bracket 2 and resists the ratchet 4, and at the same time the second resisting member 7 resists the belt hole 104, and is divided into a first working position 102 and a second working position 103 along an outer edge of the belt hole 104. When the tensioner is in a loose belt state, the second resisting member 7 resists the first working position 102 by an external force. When the tensioner is in a tight belt state, the second resisting member 7 resists the second working position 103 by an external force.

In this technical solution, by providing the gasket 301 and the gasket 302 on two sides of the ratchet 4, the gasket 301 can reduce the friction between the ratchet 4 and the belt shaft hole 104, and the gasket 302 can reduce the friction between the ratchet 4 and the clamping portion 201. At the same time, the provision of the balls 304 in the accommodating cavity 205 can further reduce the friction and increase the freedom of rotation of the belt shaft 3 without affecting the free use of the tensioner.

Preferably, as shown in FIG. 3, a surface of the outer gasket 302 of the belt shaft 3 is provided with a ball groove 303. The ball groove 303 cooperates with a ball cover 305 to install balls 304 on the outer gasket 302. The balls 304 are evenly distributed around the outer gasket 302. There are 6 balls.

In this technical solution, the six balls 304 evenly distributed on a peripheral surface of the circular gasket 302 can allow the belt shaft 3 to rotate freely in the accommodating cavity 205.

Preferably, the gaskets 301 and 302 of the belt shaft 3 are made of plastic material.

In this technical solution, since the belt shaft 3 and the first bracket 1 are of a steel structure, and the second bracket 2 is made of aluminum alloy, the plastic gaskets 301 and 302 can reduce the friction to a greater extent and reduce costs.

Preferably, a handle 202 is provided at the other end of the second bracket 2. A fastening through hole 203 is provided on the second bracket 2. A bolt is installed on the fastening through hole 203. The clamping portion 201 clamps the belt shaft 3 by tightening the bolt.

In this technical solution, the stability of the second bracket 2 is improved by bolt fasteners while adjusting the tightness of the clamping portion 201. The fastening through hole 203 is provided below a first guide groove 702 and close to the clamping portion 201.

Preferably, the first resisting member 6 includes a first resisting piece 601, a first spring 603, and a first elongated guide hole 602 provided on the first bracket 1. The first resisting piece 601 is provided in the first guide hole 602 and can move along the first guide hole 602. One end of the first spring 603 is connected to the first bracket 1 and the other end is connected to the first resisting piece 601. The first spring 603 provides the first resisting piece 601 with a force that always resists the ratchet 4.

Preferably, the second resisting member 7 includes a second resisting piece 701, a handle 703, a second spring 704, and a first guide groove 702 provided on the second bracket 2. The second resisting piece 701 is installed in a first guide groove 702 and can move along the first guide groove 702. The handle 703 is fixedly connected to the second resisting piece 701. One end of the second spring 704 is connected to the second bracket 2, and the other end is connected to the second resisting piece 701 and can provide the second resisting piece 701 with a force that always resists the ratchet 4. By pulling the handle 703, an elastic force of the second spring 705 can be overcome to make the second resisting piece 701 move away from the ratchet 4.

In this technical solution, the second resisting piece 701 can be adjusted to be in the first working position 102 or the second working position 103 by pulling the handle 703 to switch the working state of the tensioner.

Preferably, a rear hook shaft 101 is provided at a rear end of the first bracket 1.

Preferably, the number of teeth of the ratchet 4 is 16 teeth.

In this technical solution, the number of teeth of the ratchet 4 can be 13, 16 or more, which is not limited in the specific embodiment of the present invention. The more teeth of the ratchet 4, the more the tensioner can tighten the binding belt. For the sake of production, the ratchet 4 with 16 teeth is preferred in the embodiment of the present invention.

Compared with the prior art, the tensioner of the present invention is simple in structure and low in cost. The plastic gaskets provided on two sides of the ratchet greatly reduce the friction between the ratchet and the bracket; at the same time, balls are provided between the outer gasket and the clamping portion of the bracket to provide a certain degree of freedom for the belt shaft to prevent the belt shaft from jamming; and at the same time, a bolt through hole is provided on the second bracket to improve the stability of the bracket.

It should be noted that in this article, relational terms such as first and second are only used to distinguish one entity or operation from another entity or operation, and do not necessarily require or imply that these entities or operations have any such actual relationship or order. Moreover, the terms "include", "comprise" or any other variant thereof are intended to cover non-exclusive inclusion, so that a process, method, article or device that includes a series of elements includes not only those elements, but also those not explicitly listed or other elements that are inherent to this process, method, article, or device. In the absence of more restrictions, the elements defined by the sentence "comprising a . . ." do not exclude that there are other identical elements in the process, method, article or device that includes the elements.

The above is only a specific implementation of the present application. It should be pointed out that for those skilled in the art, without departing from the principles of the present application, several improvements and modifications can be made which should also be regarded as the scope of protection of the present application.

What is claimed is:

1. A tensioner, comprising a belt shaft, a first bracket, a second bracket, a first resisting member and a second resisting member, wherein a belt shaft hole is provided at a front end of the first bracket, and the belt shaft passes through the belt shaft hole and is hinged with the first bracket; a surface of the belt shaft is provided with a ratchet fixedly connected thereto and gaskets provided on two sides of the ratchet; one end of the second bracket is provided with a clamping portion, the clamping portion clamps two ends of the belt shaft, the clamping portion protrudes outwardly to form an accommodating cavity, balls are provided inside the accommodation cavity, and the balls are installed on an outer gasket of the belt shaft; the first resisting member is installed on the first bracket and always resists the ratchet, the second resisting member is installed on the second bracket and resists the ratchet, and at the same time the second resisting member resists the belt shaft hole, and is divided into a first working position and a second working position along an outer edge of the belt shaft hole; and when the tensioner is in a loose belt state, the second resisting member resists the first working position by an external force, and when the tensioner is in a tight belt state, the second resisting force member resists the second working position by an external force; a ball groove is provided on a surface of the outer gasket of the belt shaft, the ball groove cooperates with a ball cover to install the balls on the outer gasket, and the balls are evenly distributed around the outer gasket, wherein a handle is provided at the other end of the second bracket, a fastening through hole is provided on the second bracket, a bolt is installed on the fastening through hole, and by tightening the bolt, the clamping portion clamps the belt shaft.

2. The tensioner according to claim 1, wherein the number of the balls is six.

3. The tensioner according to claim 1, wherein the gasket of the belt shaft is made of plastic material.

4. The tensioner according to claim 1, wherein the first resisting member comprises a first resisting piece, a first spring, and a first elongated guide hole provided on the first bracket, the first resisting piece is disposed in the first guide hole and can move along the first guide hole, one end of the first spring is connected to the first bracket and the other end is connected to the first resisting piece, and the first spring provides the first resisting member with a force that always resists the ratchet.

5. The tensioner according to claim 1, wherein the second resisting member comprises a second resisting piece, a handle, a second spring, and a first guide groove provided on the second bracket, the second resisting piece is installed in the first guide groove and can move along the first guide groove, the handle is fixedly connected to the second resisting piece, one end of the second spring is connected to the second bracket and the other end is connected to the second resisting piece and can provide the second resisting member with a force that always resists the ratchet, and by pulling the handle, an elastic force of the second spring can be overcome to make the second resisting piece move away from the ratchet.

6. The tensioner according to claim 1, wherein a rear hook shaft is provided at a rear end of the first bracket.

7. The tensioner according to claim 1, wherein the number of teeth of the ratchet is 16 teeth.

8. The tensioner according to claim 1, wherein the fastening through hole is provided below a first guide groove.

* * * * *